US012327901B2

(12) United States Patent
Cao et al.

(10) Patent No.: US 12,327,901 B2
(45) Date of Patent: Jun. 10, 2025

(54) PHASE SHIFTER COMPRISING A HYDROPHOBIC PART AND A HYDROPHILIC PART ARRANGED RELATIVE TO A FIRST WIRE AND SECOND WIRES FORMED ON A SUBSTRATE

(71) Applicant: BOE Technology Group Co., Ltd., Beijing (CN)

(72) Inventors: Zibo Cao, Beijing (CN); Jingwen Guo, Beijing (CN); Qianhong Wu, Beijing (CN); Chunxin Li, Beijing (CN); Jianxing Liu, Beijing (CN); Jianyun Zhao, Beijing (CN); Feng Qu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/016,743

(22) PCT Filed: Jan. 4, 2022

(86) PCT No.: PCT/CN2022/070042

§ 371 (c)(1),
(2) Date: Jan. 18, 2023

(87) PCT Pub. No.: WO2023/130201

PCT Pub. Date: Jul. 13, 2023

(65) Prior Publication Data

US 2024/0243457 A1 Jul. 18, 2024

(51) Int. Cl.

*H01P 1/18* (2006.01)
*H01P 1/30* (2006.01)
*H01P 11/00* (2006.01)

(52) U.S. Cl.

CPC ................ *H01P 1/184* (2013.01); *H01P 1/30* (2013.01); *H01P 11/00* (2013.01)

(58) Field of Classification Search

CPC ...................................................... H01P 1/184

(Continued)

(56) References Cited

U.S. PATENT DOCUMENTS

2002/0181725 A1 12/2002 Johannsen et al.
2015/0372361 A1 12/2015 Abdellatif et al.

(Continued)

FOREIGN PATENT DOCUMENTS

CN 1269383 C 8/2006
CN 105489978 A 4/2016

(Continued)

*Primary Examiner* — Benny T Lee

(74) *Attorney, Agent, or Firm* — WHDA, LLP

(57) ABSTRACT

The phase shifter includes a substrate; a first wire and second wires arranged on a side of the substrate, wherein two opposite sides of the first wire are respectively provided with the second wires, and the first wire and the second wires are arranged in parallel and insulated from each other; a hydrophobic conductive part, which is arranged crosswise with the first wire and is insulated from the first wire, and at least one end of the hydrophobic conductive part is overlapped with the second wire at one side of the first wire, and is insulated from the second wire; and a hydrophilic part, wherein a minimum distance between an orthographic projection of the hydrophilic part on the substrate and an orthographic projection of the hydrophobic conductive part that does not overlap with the second wires, in a first direction, is less than or equal to a preset value.

20 Claims, 13 Drawing Sheets

(58) Field of Classification Search
USPC .......................................................... 333/161
See application file for complete search history.

(56) References Cited

U.S. PATENT DOCUMENTS

| | | | | |
|---|---|---|---|---|
| 2022/0140460 | A1* | 5/2022 | Guo et al. ............... | H01P 1/181<br>343/700 R |
| 2022/0302566 | A1* | 9/2022 | Guo et al. ............... | H01P 1/182 |
| 2022/0311112 | A1 | 9/2022 | Wang et al. | |

FOREIGN PATENT DOCUMENTS

| | | | |
|---|---|---|---|
| CN | 106365104 | B | 11/2018 |
| CN | 111383998 | A | 7/2020 |
| CN | 101695896 | A | 9/2020 |
| CN | 111640881 | A | 9/2020 |
| JP | 2004-157151 | A | 6/2004 |
| JP | 2004-193327 | A | 7/2004 |
| WO | 2021/088519 | A1 | 5/2021 |

* cited by examiner

PHASE SHIFTER COMPRISING A HYDROPHOBIC PART AND A HYDROPHILIC PART ARRANGED RELATIVE TO A FIRST WIRE AND SECOND WIRES FORMED ON A SUBSTRATE

CROSS-REFERENCE TO RELATED APPLICATION

The present disclosure is a National Stage of International Application No. PCT/CN2022/070042, filed on Jan. 4, 2022, with the title of "PHASE SHIFTER AND METHOD FOR PREPARING THE SAME", which is incorporated herein in its entirety by reference.

FIELD

The application relates to the technical field of Micro-Electro-Mechanical System, in particular to a phase shifter and a method for preparing the phase shifter.

BACKGROUND

With the rapid development of the information age, wireless terminals with high integration, miniaturization, multi-function and low cost have gradually become the development trend of communication technology. In communication and radar applications, phase shifters are essential components. Micro-Electro-Mechanical System (MEMS) phase shifter has obvious advantages in terms of insertion loss, power consumption, volume and cost, and has received extensive attention in the fields of radio communication and microwave technology.

SUMMARY OF THE INVENTION

The embodiments of the application adopt the following technical solution:

On the one hand, a phase shifter is provided, including:

a substrate;

a first wire and second wires arranged on a side of the substrate, wherein the second wires are arranged on two opposite sides of the first wire, and the first wire and the second wires are arranged in parallel and insulated from each other;

a hydrophobic conductive part, wherein the hydrophobic conductive part is arranged crosswise with the first wire and is insulated from the first wire, and at least one end of the hydrophobic conductive part is overlapped with the second wire at one side of the first wire, and is insulated from the second wire; and a hydrophilic part, wherein a minimum distance between an orthographic projection of the hydrophilic part on the substrate and an orthographic projection of a part of the hydrophobic conductive part that does not overlap with the second wires, on the substrate, in a first direction, is less than or equal to a preset value, and the first direction is parallel to an extending direction of the first wire.

In an embodiment, the orthographic projection of the hydrophilic part on the substrate is located on at least one side of the orthographic projection of the hydrophobic conductive part on the substrate.

In an embodiment, the hydrophilic part is arranged on one side of the substrate, on which the hydrophobic conductive part is located, and is located in areas between the first wire and the second wires.

In an embodiment, the first wire includes a first side and a second side opposite to each other, an area between the first side of the first wire and the second wire set on the first side of the first wire is a first area, an area between the second side of the first wire and the second wire set on the second side of the first wire is a second area; and the hydrophilic part includes a plurality of hydrophilic units, the plurality of hydrophilic units are divided into two groups, a first group of the plurality of hydrophilic units are located in the first area, and a second group of the plurality of hydrophilic units are located in the second area.

In an embodiment, each group of the hydrophilic units is divided into a first part and a second part, orthographic projections of the hydrophilic units of the first part on the substrate are located on a first side of the orthographic projection of the hydrophobic conductive part on the substrate, and orthographic projections of the hydrophilic units of the second part on the substrate are located on a second side of the orthographic projection of the hydrophobic conductive part on the substrate, opposite to the first side of the orthographic projection of the hydrophobic conductive part on the substrate.

In an embodiment, in the respective parts of the respective groups of the hydrophilic units, the hydrophilic units have a same hydrophilicity.

In an embodiment, in the respective parts of the respective groups of the hydrophilic units, a plurality of the hydrophilic units arranged along a second direction do not contact each other, and the second direction intersects the first direction.

In an embodiment, the respective parts of the respective groups of the hydrophilic units include two hydrophilic units arranged along the second direction, and separated by a first distance, the first distance is less than or equal to a height of the hydrophobic conductive part, and the height of the hydrophobic conductive part is a distance between the hydrophobic conductive part and the first wire when the hydrophobic conductive part is not powered on.

In an embodiment, in the respective parts of the respective groups of hydrophilic units, the hydrophilic unit includes a hydrophilic layer with hydrophilicity decreasing in a direction from an area far from the hydrophobic conductive part to an area close to the hydrophobic conductive part.

In an embodiment, the hydrophilic layer includes a first hydrophilic sublayer and a second hydrophilic sublayer, compared with the second hydrophilic sublayer, the first hydrophilic sublayer is further away from the hydrophobic conductive part, and a contact angle of the first hydrophilic sublayer is smaller than a contact angle of the second hydrophilic sublayer.

In an embodiment, the contact angle of the first hydrophilic sublayer is X, $X \leq 10°$, and the contact angle of the second hydrophilic sublayer is Y, $20° \leq Y \leq 65°$.

In an embodiment, the phase shifter further includes a first hydrophobic part, and the first hydrophobic part is arranged on a side of the substrate, on which the hydrophobic conductive part is located, and is located in the areas between the first wire and the second wires; and an orthographic projection of the first hydrophobic part on the substrate is located within the orthographic projection of the hydrophobic conductive part on the substrate.

In an embodiment, a contact angle of the first hydrophobic part is C, $170° \leq C \leq 180°$.

In an embodiment, the first hydrophobic part includes a plurality of hydrophobic units arranged in an array.

In an embodiment, the hydrophilic part is cross arranged with the first wire and insulated from the first wire, and at least one end of the hydrophilic part is overlapped with the second wire at one side of the first wire, and is insulated from the second wire.

In an embodiment, both ends of the hydrophilic part are respectively overlapped with the second wires on both sides of the first wire, and are insulated from the second wires; and one end of the hydrophobic conductive part is overlapped with the second wire on one side of the first wire, and is insulated from the second wire, and another end of the hydrophobic conductive part is suspended.

In an embodiment, a height of the hydrophilic part is lower than that of the hydrophobic conductive part by 0.1-10 microns, the height of the hydrophilic part is a distance between the hydrophilic part and the first wire, and the height of the hydrophobic conductive part is a distance between the hydrophobic conductive part and the first wire when the hydrophobic conductive part is not powered on.

In an embodiment, the orthographic projection of the hydrophilic part on the substrate are respectively located on both sides of the orthographic projection of the hydrophobic conductive part on the substrate.

In an embodiment, the phase shifter further includes second hydrophobic parts, and the second hydrophobic parts are arranged on one side of the substrate, on which the hydrophobic conductive part is located, and are located in the areas between the first wire and the second wires.

In an embodiment, the hydrophobic conductive part includes a conductive layer and a hydrophobic layer covering an exposed part of the conductive layer.

On the other hand, a method for preparing the above phase shifter is provided, including:

- providing the substrate;
- forming the first wire and the second wires on the side of the substrate, wherein two opposite sides of the first wire are respectively provided with the second wires, and the first wire and the second wires are arranged in parallel and insulated from each other;
- forming the hydrophobic conductive part, wherein the hydrophobic conductive part is arranged crosswise with the first wire and is insulated from the first wire, and at least one end of the hydrophobic conductive part is overlapped with the second wire at one side of the first wire, and is insulated from the second wire; and
- forming a hydrophilic part, wherein the minimum distance between the orthographic projection of the hydrophilic part on the substrate and the orthographic projection of the part of the hydrophobic conductive part that does not overlap with the second wires, on the substrate, in a first direction, is less than or equal to the preset value, and the first direction is parallel to the extending direction of the first wire.

The above description is only an overview of the technical solution of the application. In order to better understand the technical means of the application, it may be implemented according to the content of the description, and in order to make the above and other purposes, features and advantages of the application more apparent and understandable, the specific implementations of the application are described below.

BRIEF DESCRIPTION OF THE DRAWINGS

In order to more clearly describe the embodiments of the application or the technical solution in the prior art, the following will briefly introduce the drawings needed to be used in description of the embodiments or the prior art. Apparently, the drawings in the following description are some embodiments of the application. For ordinary skilled in the art, the ordinary skilled may also obtain other drawings based on these drawings without paying creative labor.

DETAILED DESCRIPTION OF THE EMBODIMENTS

In order to make the purposes, technical solutions and advantages of the embodiments of the application clearer, the following will describe the technical solutions in the embodiments of the application clearly and completely in combination with the drawings in the embodiments of the application. Apparently, the described embodiments are part of the embodiments of the application, but are not all of the embodiments of the application. Based on the embodiments in the application, all other embodiments obtained by ordinary skilled in the art without paying creative labor belong to the scope of protection in the application.

In the embodiments of the application, words such as "first" and "second" are used to distinguish the same or similar items with basically the same function and action, which is only for the purpose of clearly describing the technical solution of the embodiments of the application, and cannot be understood as indicating or implying the relative importance or implicitly indicating the quantity of the indicated technical features. In addition, "a plurality of" means two or more, and "at least one" means one or more, unless otherwise specified.

MEMS phase shifters are prone to adhesion when working in a humid environment, thus reducing the reliability and quality of products.

Figure 1:
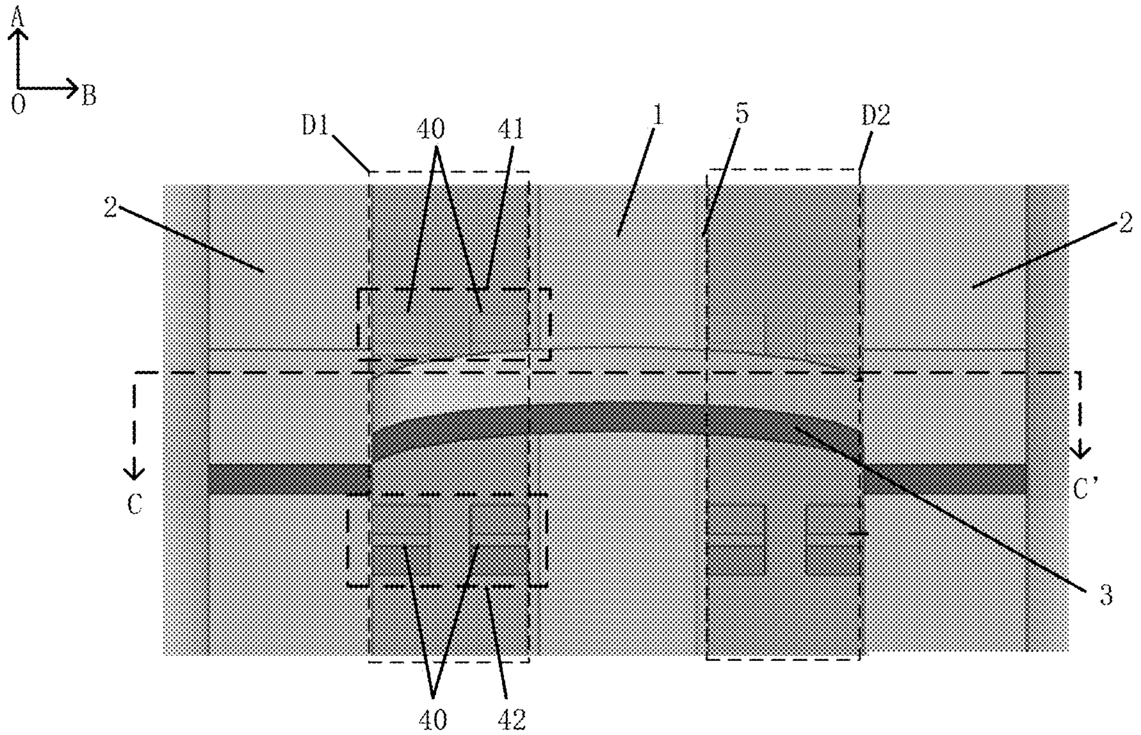
FIG. 1 is a 45 degrees vertical view schematically showing a first phase shifter.
Figure 2:
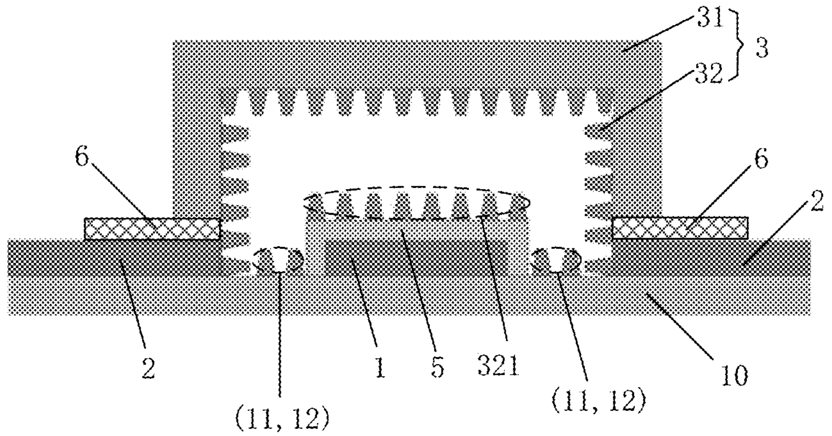
FIG. 2 is a sectional view along a CC' direction of FIG. 1.
Figure 11:
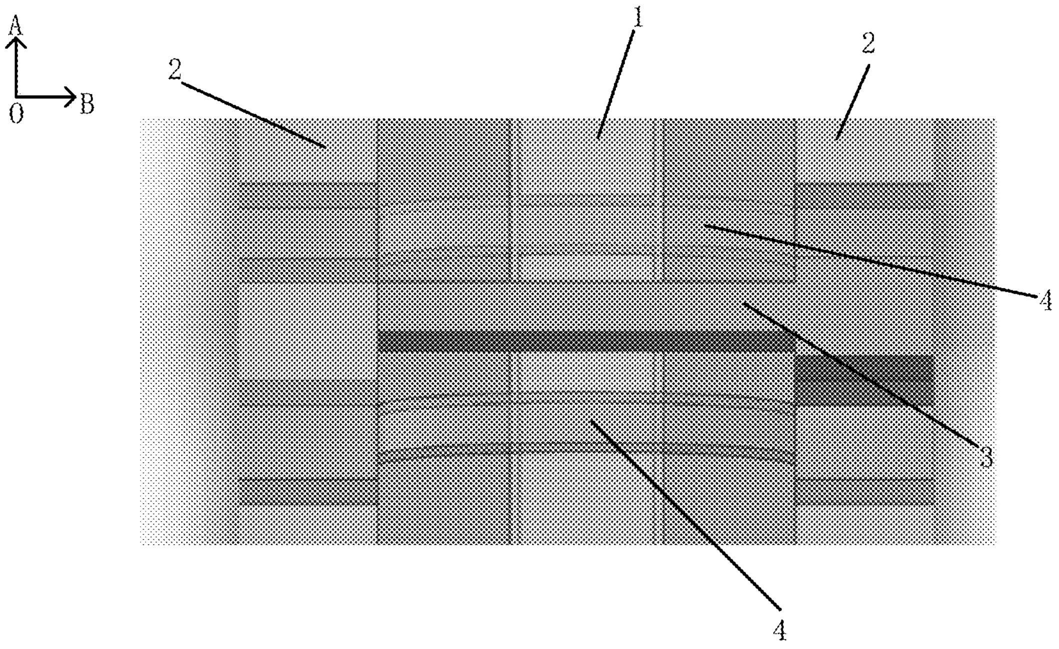
FIG. 11 is a 45 degrees vertical view schematically showing a fifth phase shifter.
Figure 12:
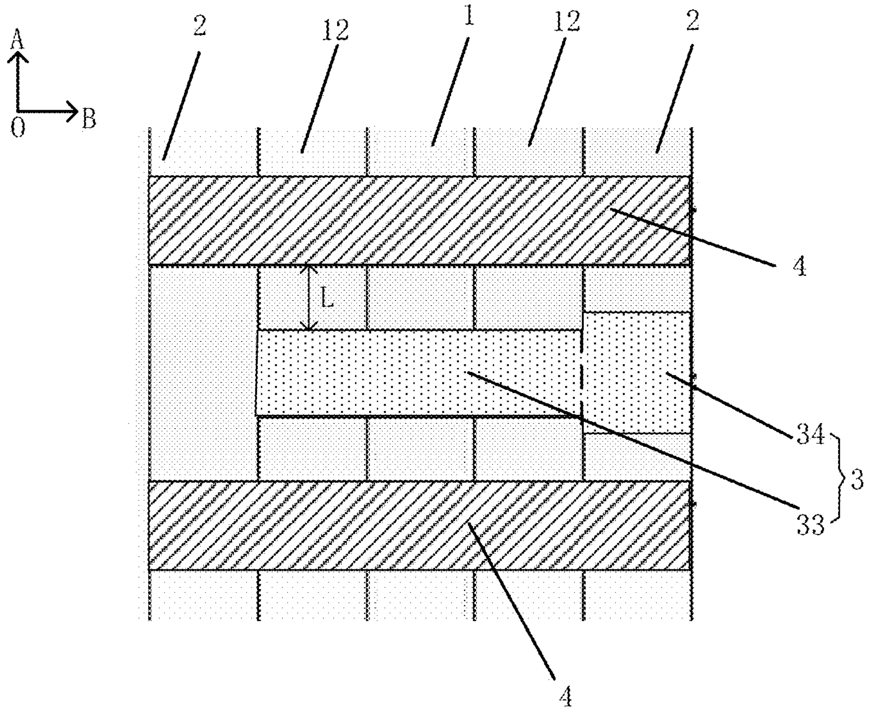
FIG. 12 is a 90 degrees vertical view of the phase shifter shown in FIG. 11.

An embodiment of the application provides a phase shifter, as shown in FIGS. 1-13, including:

- a substrate 10 (as shown in FIG. 2), wherein a material of the substrate may include silicon nitride, silicon oxide, silicon or a semiconductor material such as gallium nitride and so on, which may be specifically prepared by means of magnetron sputtering, or chemical vapor deposition and so on;
- a first wire 1 and second wires 2 arranged on a side of the substrate 10, wherein two opposite sides of the first wire 1 are respectively provided with the second wires 2, and the first wire 1 and the second wires 2 are arranged in parallel and insulated from each other;

a hydrophobic conductive part 3, wherein the hydrophobic conductive part 3 is arranged crosswise with the first wire 1 and is insulated from the first wire 1, and at least one end of the hydrophobic conductive part 3 is overlapped with the second wire 2 at one side of the first wire 1, and is insulated from the second wire 2; and a hydrophilic part 4 (as shown in FIGS. 11 and 12, including hydrophilic units 40 shown in FIG. 1), wherein a minimum distance L (as shown in FIGS. 3, 5, 9 and 12) between an orthographic projection of the hydrophilic part on the substrate and an orthographic projection of a part 33 (FIGS. 3, 5, 9) of the hydrophobic conductive part 3 that does not overlap with the second wires, on the substrate, in a first direction, is less than or equal to a preset value, and the first direction OA (as shown in FIG. 1) is parallel to an extending direction of the first wire 1.

It should be noted that the hydrophobic conductive part is configured so that there is a gap between the hydrophobic conductive part and the first wire, and the hydrophobic conductive part and the first wire do not contact each other when no power is applied on them. When the power is applied on them, the hydrophobic conductive part deforms to a side close to the first wire 1.

Figure 8:
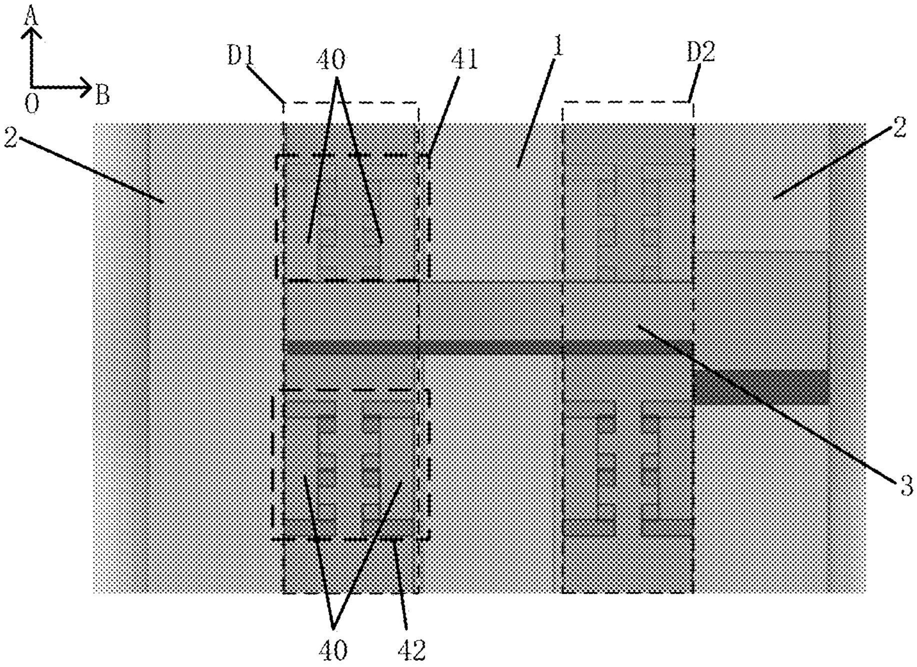
FIG. 8 is a 45 degrees vertical view schematically showing a fourth phase shifter.
Figure 9:
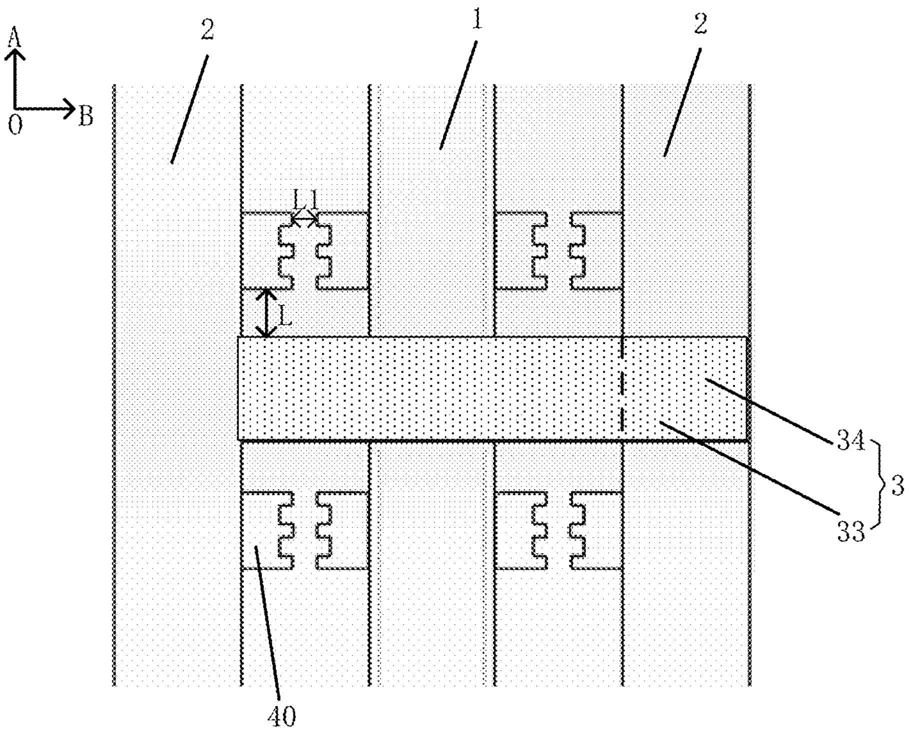
FIG. 9 is a 90 degrees vertical view of the phase shifter shown in FIG. 8.
Figure 10:
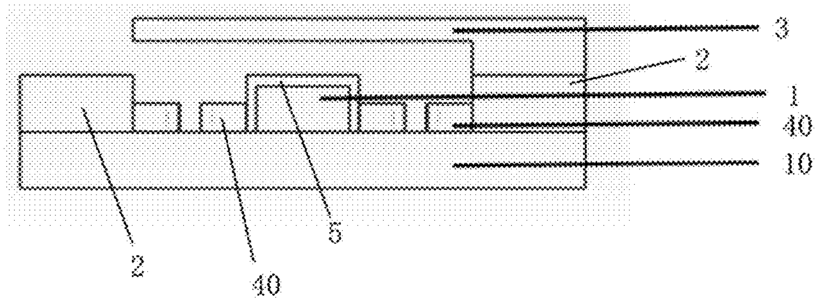
FIG. 10 is a structure diagram of the phase shifter shown in FIG. 8 looking in an OA direction.

A structure of the above hydrophobic conductive part is not limited. For example, the hydrophobic conductive part may include a hydrophobic conductive bridge. The hydrophobic conductive bridge is a simple-supported beam structure, that is, as shown in FIG. 1, both ends 34 (FIGS. 3, 5, 9) of the hydrophobic conductive part 3 are respectively overlapped with the second wires 2 on both sides of the first wire 1 and insulated from the second wires 2. Alternatively, the hydrophobic conductive part may include a hydrophobic cantilever beam. As shown in FIG. 8, one end 34 of the hydrophobic conductive part 3 is overlapped with the second wire 2 on one side of the first wire 1, and is insulated from the second wire 2, while the other end 34 is suspended. FIG. 9 is a 90 degrees vertical view of the phase shifter shown in FIG. 8, and FIG. 10 is a structure diagram of the phase shifter shown in FIG. 8 looking in an OA direction.

The hydrophobic conductive part has hydrophobicity and conductivity, and the structure thereof is not limited. For example, referring to that shown in FIG. 2, the hydrophobic conductive part 3 includes a conductive layer 31 and a hydrophobic layer 32 covering an exposed part of the conductive layer 31. A material of the conductive layer may include metal materials such as copper, aluminum or gold and so on, which may be prepared by means of magnetron sputtering, thermal evaporation or electroplating and so on. A material of the hydrophobic layer may include fluorine-containing materials such as fluorocarbon compounds and so on, for example, perfluorooctanoic acid, which may be specifically prepared by means of liquid deposition (such as liquid phase self-assembly), electrodeposition or solid phase deposition (such as chemical vapor deposition) and so on. A contact angle of the hydrophobic layer may be greater than 90°, such as 95°, 100°, 130°, 150° or 170°, and so on. The contact angle refers to an angle by which a liquid phase is clamped by a gas liquid interface tangent line and a solid liquid interface tangent line at a solid liquid gas three-phase junction on a solid surface, when a liquid drop is dropped on a solid horizontal plane. The contact angle may be measured by relevant instruments.

Figure 4:
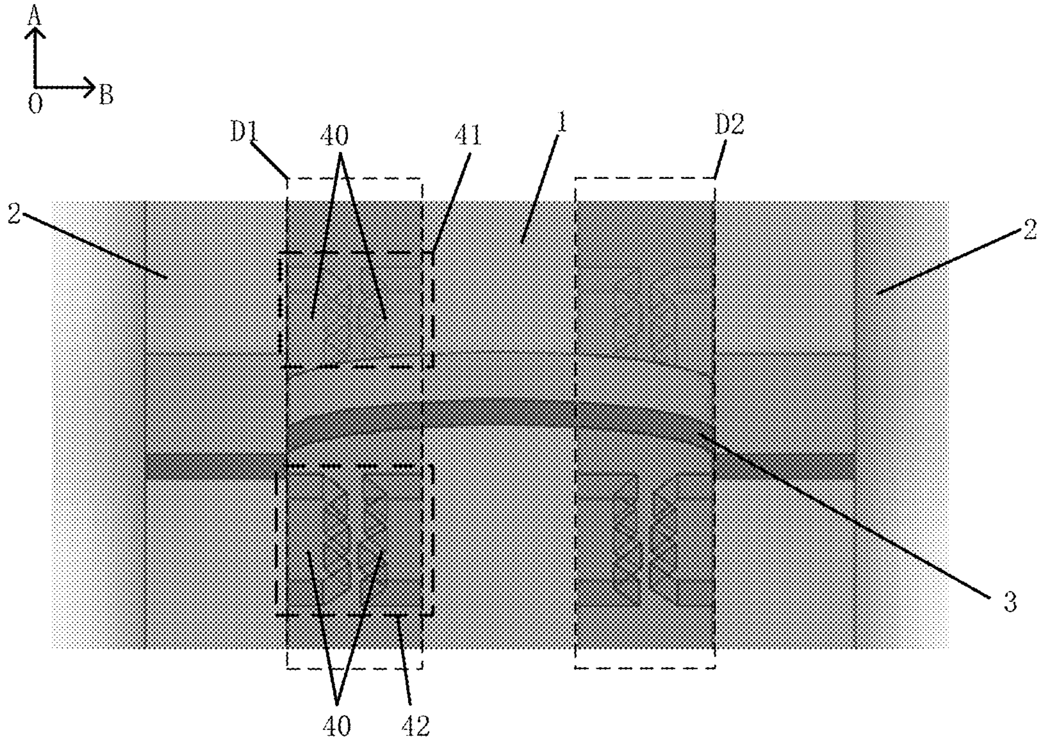
FIG. 4 is a 45 degrees vertical view schematically showing a second phase shifter.

The above hydrophilic part is hydrophilic, and its structure is not limited. For example, the hydrophilic part may include hydrophilic units 40 arranged on a side of the substrate as shown in FIGS. 1 and 4. Alternatively, as shown in FIG. 11, the hydrophilic part 4 may further include a hydrophilic simple-supported beam structure. The specific materials of the hydrophilic part are not limited, for examples, may include hydrophilic materials such as silicon dioxide or silicon nitride, and so on. The contact angle of the hydrophilic part is less than or equal to 65°, such as 10°, 30°, 50°, 60° or 65°, and so on.

The minimum distance (for example, L shown in FIGS. 3, 5, 9 and 12) between the orthographic projection of the above hydrophilic part on the substrate and the orthographic projection of the part 33 of the hydrophobic conductive part that does not overlap with the second wires, on the substrate, is less than or equal to the preset value in the first direction. Here, the preset value may be selected according to the actual situation. For example, the preset value may be 60 microns, and the minimum distance may be 0 microns, 10 microns, 20 microns, 30 microns, 40 microns, 50 microns, and so on. If the minimum distance is too large, it is not conducive for the hydrophilic part to lead water vapor, water droplets, etc. from an area where the hydrophobic conductive part is located. If the minimum distance is too small, the influence of water vapor and water droplet on the phase shifter cannot be completely avoided.

Materials of the above first and second wire may include metal materials such as copper, aluminum or gold, and so on, or conductive metal oxides, for example, the material such as indium tin oxide or zinc oxide, and so on, which may be specifically prepared by means of magnetron sputtering, thermal evaporation, or electroplating, and so on.

In order to ensure that the hydrophobic conductive part and the first wire are mutually insulated, the above phase shifter may further include a first insulating part 5 as shown in FIG. 2. The first insulating part 5 is arranged on a side of the first wire 1 close to the hydrophobic conductive part 3. In order to ensure that the hydrophobic conductive part 3 and the second wires 2 are mutually insulated, the phase shifter may further include second insulating parts 6 as shown in FIG. 2. The second insulating parts 6 are arranged on sides of the second wires 2 close to the hydrophobic conductive part 3. Materials of first insulating part and the second insulating parts may adopt insulating materials such as silicon nitride or silicon oxide, and so on, which may be specifically prepared by means of magnetron sputtering or chemical vapor deposition, and so on. A part of the hydrophobic layer may be further provided on the substrate 10, as a first hydrophobic part 11 or second hydrophobic parts 12 mentioned in FIGS. 6 and 12. Another part of the hydrophobic layer may be further provided on the first insulating part 5, as indicated by reference label 321.

The above first wire may be used as a Coplanar Waveguide (CPW) signal line, and the second wires may be used as a CPW ground wire. The first wire and the second wires cooperate to form a coplanar waveguide transmission line. A phase-shifting principle of the phase shifter is: when the hydrophobic conductive part is not energized, that is, no driving voltage is applied on the hydrophobic conductive part, there is a gap between the hydrophobic conductive part and the first insulating part, and the hydrophobic conductive part and the first insulating part do not contact each other, and when a high-frequency signal passes through the phase shifter, the high-frequency signal has no phase change. When the hydrophobic conductive part is energized, that is, a driving voltage is applied on the hydrophobic conductive part, the hydrophobic conductive part deforms to a side close to the first insulating part under an action of electrostatic force, and when the driving voltage is large enough, the electrostatic force pulls the hydrophobic conductive part down to contact with the first insulating part. After the hydrophobic conductive part is deformed, the distance between the hydrophobic conductive part and the first wire is changed, thus changing distributed capacitance of the coplanar waveguide transmission line, thus making the coplanar waveguide transmission line be a slow wave system, which plays a role of phase delay.

In this application, if water droplets are generated in an area where the hydrophobic conductive part is located, since the hydrophobic conductive part is hydrophobic and the hydrophilic part is hydrophilic, the water droplets will be directed to an area where the hydrophilic part is located, thereby reducing adhesion caused by the water droplets, thereby improving product performance and improving reliability of working in a humid environment.

In one or more embodiments, the orthographic projection of the hydrophilic part on the substrate is arranged on at least one side of the orthographic projection of the hydrophobic conductive part on the substrate. In order to protect the hydrophobic conductive part to the greatest extent and avoid an adhesion problem due to the influence of water droplets on the hydrophobic conductive part, the orthographic projection of the hydrophilic part on the substrate are located on both sides of the orthographic projection of the hydrophobic conductive part on the substrate. At this time, areas of both sides of the hydrophobic conductive part (i.e., an upper side and a lower side along a second direction, i.e., an OB direction, as shown in FIG. 1) are provided with the hydrophilic part.

A structure of the hydrophilic part is provided below.

In an embodiment, referring to that shown in FIG. 1, FIG. 4, FIG. 6 and FIG. 8, the hydrophilic part is arranged on one side of the substrate, on which the hydrophobic conductive part is located, and is located in areas between the first wire 1 and the second wires 2.

In an embodiment, the first wire includes a first side and a second side opposite to each other. An area between the first side of the first wire and the second wire set on the first side of the first wire is a first area (for example, D1 shown in FIGS. 1, 4, 6 and 8). An area between the second side of the first wire and the second wire set on the second side of the first wire is a second area (for example, D2 shown in FIGS. 1, 4, 6 and 8).

The hydrophilic part includes a plurality of hydrophilic units (for example, reference sign 40 shown in FIGS. 1, 4 and 8). The plurality of hydrophilic units are divided into two groups. A first group of the plurality of hydrophilic units are located in the first area (for example, D1 shown in FIGS. 1, 4 and 8), and a second group of the plurality of hydrophilic units are located in the second area (for example, D2 shown in FIGS. 1, 4 and 8).

A number of hydrophilic units included in the above first group and the second group may be the same, or they may be different, which is not limited here. For example, the hydrophilic units included in the first group and the second group may be symmetrically distributed with respect to the first wire.

In this way, hydrophilic units are set on both sides of the first wire, which may lead the water droplets on both sides of the first wire to the hydrophilic units, so as to avoid the influence of the water droplets on the hydrophobic conductive bridge.

Further in an embodiment, each group of hydrophilic units is divided into a first part (for example, reference sign 41 shown in FIGS. 1, 4 and 8) and a second part (for example, reference sigh 42 shown in FIGS. 1, 4 and 8). Orthographic projections of the hydrophilic units of the first part on the substrate are located on a first side of the orthographic projection of the hydrophobic conductive part on the substrate, and orthographic projections of the hydrophilic units of the second part on the substrate are located on a second side of the orthographic projection of the hydrophobic conductive part on the substrate opposite to the first side thereof. In this way, areas of both sides of the hydrophobic conductive part (i.e., the upper side and the lower sides along the second direction, i.e., the OB direction, as shown in FIG. 1) are provided with the hydrophilic units, which may further improve a guiding effect on the water droplets and guide the water droplets to the hydrophilic units.

A number of hydrophilic units included in the first part and the second part may be the same or different, which is not limited here. For example, the hydrophilic units included in the first part and the second part may be symmetrically distributed in a mirror image.

In some embodiments, in the respective parts of the respective groups of hydrophilic units, the hydrophilic units have the same hydrophilicity. The hydrophilic units, also known as "hydrophilic synapses", may be made of the same hydrophilic material. For example, silicon nitride or silicon dioxide may be used.

In an embodiment, in the respective parts of the respective groups of hydrophilic units, with reference to that shown in FIG. 1, FIG. 4 and FIG. 8, a plurality of hydrophilic units 40 arranged along the second direction, i.e., the OB direction, do not contact each other, and the second direction, i.e., the OB direction, intersects in the first direction, i.e., the OA direction. This facilitates water droplets to flow, so as to be far away from the area where the hydrophobic conductive part is located. Here, the second direction and the first direction may intersect vertically or non-vertically, which is no limited here. The embodiments of the present application and the accompanying drawings are described by taking a vertical intersection of the second direction and the first direction, as an example.

Further in an embodiment, opposite side faces of two hydrophilic units included in the respective parts of the respective groups of hydrophilic units, are flat or uneven.

In the case that the opposite side faces of two hydrophilic units included in the respective parts of the respective groups of hydrophilic units are flat, the side faces may be straight faces or inclined faces as shown in FIG. 1, which is not limited herein. In order to simplify a composition process, the opposite side faces of two hydrophilic units included in the respective parts of the respective groups of hydrophilic units may be selected to be flat.

Figure 5:
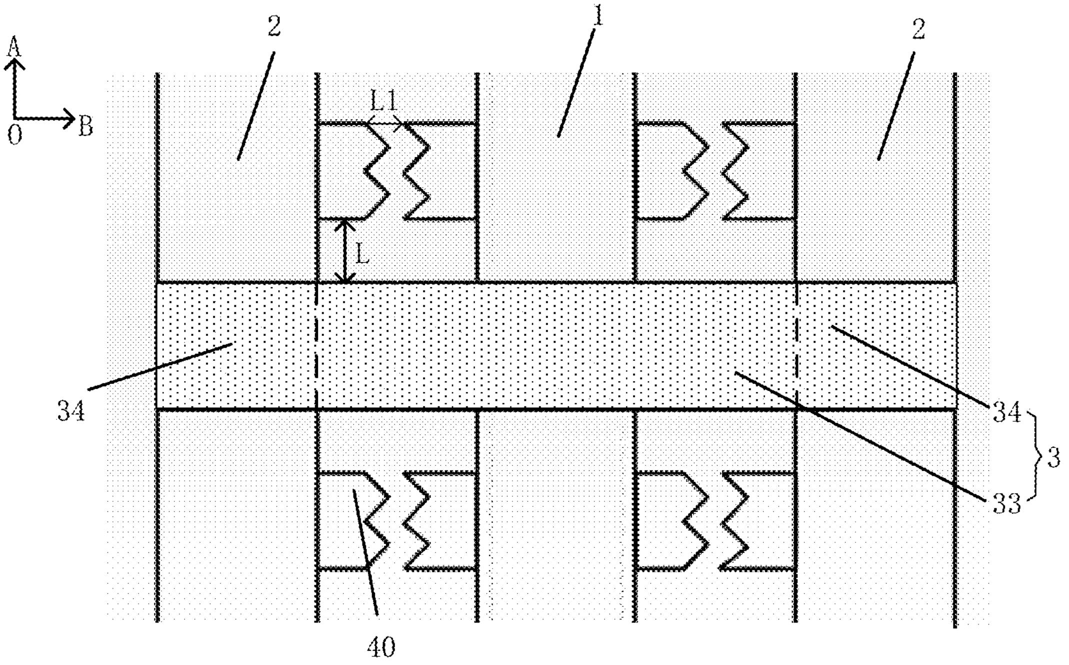
FIG. 5 is a 90 degrees vertical view of the phase shifter shown in FIG. 4.

In the case that the opposite side faces of two hydrophilic units included in the respective parts of the respective groups of hydrophilic units are uneven, the side faces may be serrated as shown in FIG. 4 and FIG. 5, or have a plurality of grooves as shown in FIG. 8 and FIG. 9. They may also be other shapes, which is not limited herein.

Herein, a specific shape of the hydrophilic unit is not limited here. For example, the shape of the hydrophilic unit may include a box, a cylinder, a circular platform, or a stair platform, and so on.

Figure 3:
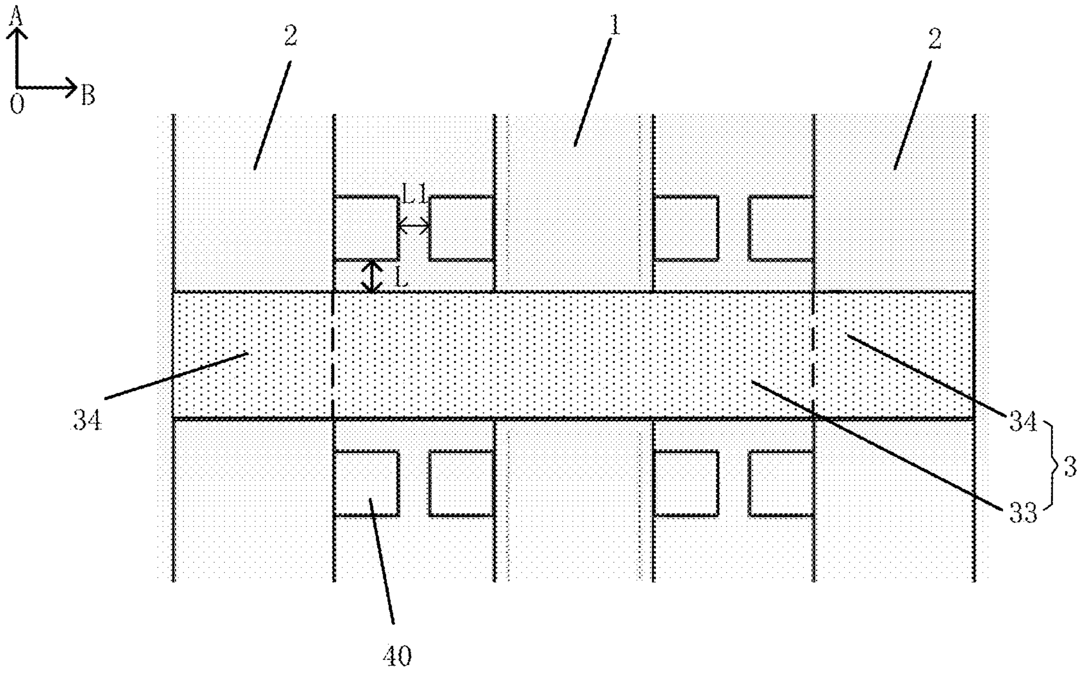
FIG. 3 is a 90 degrees vertical view of the phase shifter shown in FIG. 1.

In an embodiment, referring to that shown in FIG. 3, FIG. 5 and FIG. 9, the respective parts of the respective groups of hydrophilic units include two hydrophilic units 40 arranged along the second direction, i.e., the OB direction, and separated by a first distance L1. The first distance is less than or equal to a height of the hydrophobic conductive part. The height of the hydrophobic conductive part is a distance between the hydrophobic conductive part and the first wire when the hydrophobic conductive part is not powered on.

According to the relevant technology, in an area of a micrometer scale hydrophilic narrow slot, water droplets are more likely to condense than that in the hydrophobic plane. From the fact that in the area of the micrometer scale hydrophilic narrow slot, water droplets are more likely to condense than that in the hydrophobic plane, it may be deduced that the first distance shall be less than or equal to the height of the hydrophobic conductive part within micrometer scale, so that the first distance may be better prevented from water droplets affecting the hydrophobic conductive part.

Figure 6:
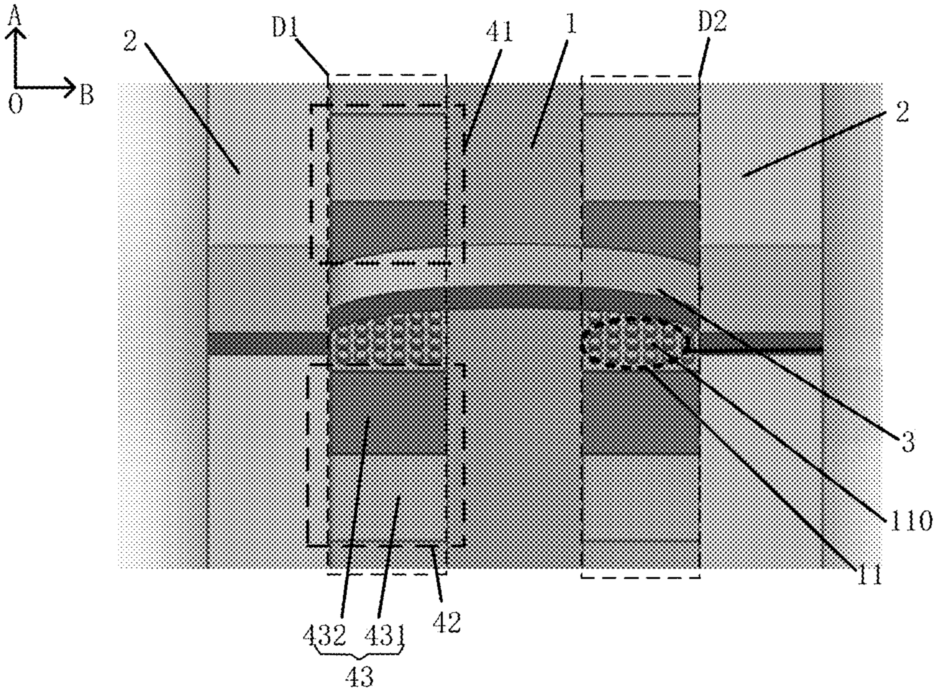
FIG. 6 is a 45 degrees vertical view schematically showing a third phase shifter.
Figure 7:
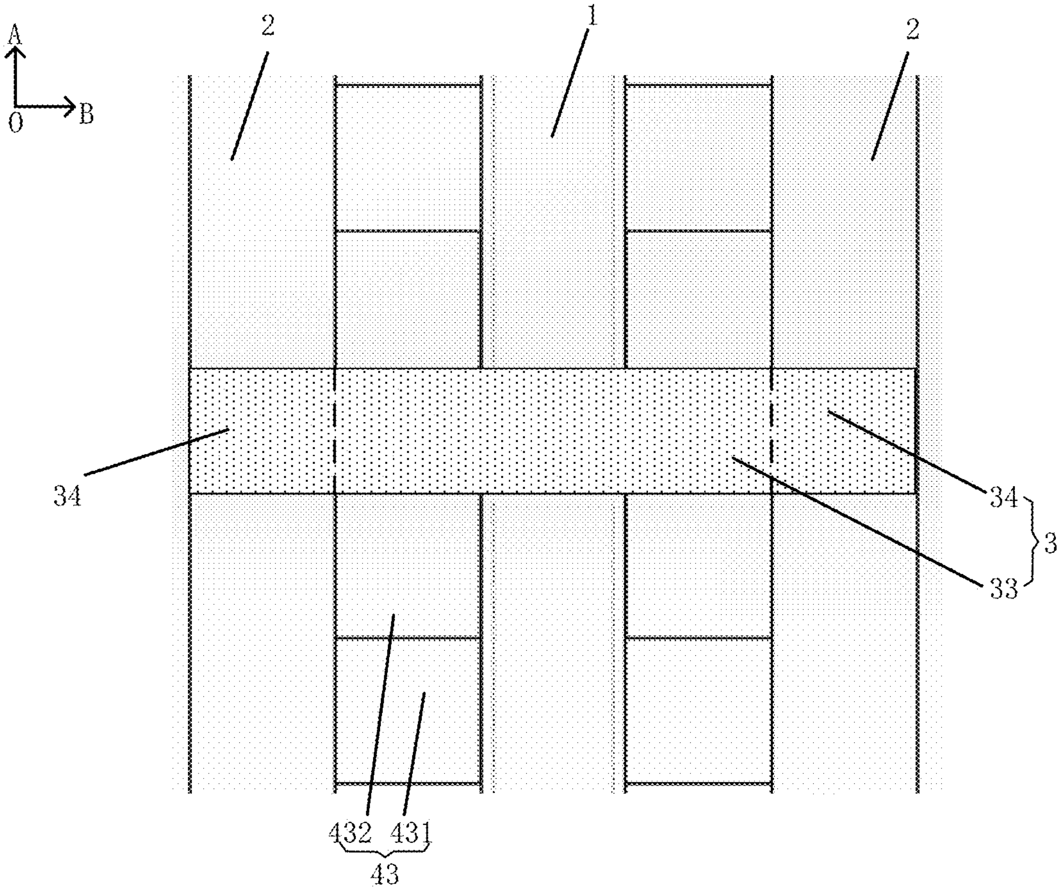
FIG. 7 is a 90 degrees vertical view of the phase shifter shown in FIG. 6.

In some embodiments, in the respective parts of the respective groups of hydrophilic units, referring to that shown in FIGS. 6 and 7, the hydrophilic unit includes a hydrophilic layer 43 with hydrophilicity decreasing in a direction from an area far from the hydrophobic conductive part to an area close to the hydrophobic conductive part, so as to better guide water droplets away from the hydrophobic conductive part. Here, the hydrophilic layer may include materials with different hydrophilicity, which is no specific limited here.

In an embodiment, referring to that shown in FIGS. 6 and 7, the hydrophilic layer 43 includes a first hydrophilic sublayer 431 and a second hydrophilic sublayer 432. Compared with the second hydrophilic sublayer 432, the first hydrophilic sublayer 431 is further away from the hydrophobic conductive part 3, and the contact angle of the first hydrophilic sublayer is smaller than the contact angle of the second hydrophilic sublayer.

In order to better guide water droplets from the area close to the hydrophobic conductive part to the area far from the hydrophobic conductive part, the contact angle of the first hydrophilic sublayer is X, $X \leq 10°$, and the contact angle of the second hydrophilic sublayer is Y, $20° \leq Y \leq 65°$.

The contact angle of the above first hydrophilic sublayer may be 2°, 4°, 6°, 8° or 10°, etc., and the contact angle of the above second hydrophilic sublayer may be 20°, 30°, 40°, 50°, 60° or 65°, etc.

Figure 13:
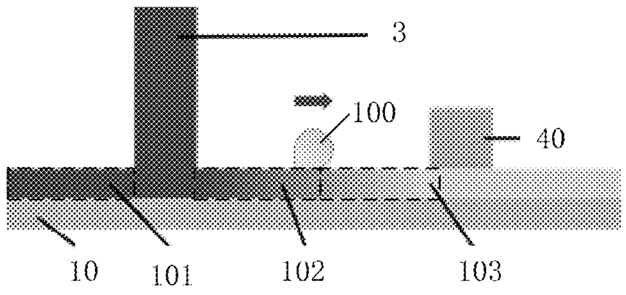
FIG. 13 is a view schematically illustrating a principle of water droplets moving towards a hydrophilic unit.

If the contact angle of the above first hydrophilic sublayer is smaller than the contact angle of the above second hydrophilic sublayer, the hydrophilicity of the first hydrophilic sublayer is greater than the contact angle of the second hydrophilic sublayer. An area where the first hydrophilic sublayer is located may be called a "super hydrophilic area", and an area where the second hydrophilic sublayer is located may be called a "hydrophilic area". Referring to that shown in FIG. 13, the hydrophobic conductive part 3 has great hydrophobicity, and the hydrophilic unit 40 has great hydrophilicity. An area 101 is located in an area with great hydrophobicity, and hydrophilicity of area 102 and area 103 increases in gradient. Under this structure, the water droplet 100 flows to the hydrophilic unit 40 along an arrow direction of FIG. 13, thus far from the hydrophobic conductive part 3. In FIG. 13, the substrate plate is marked as reference sign 10, and the principle is described here only with the structure shown in FIG. 13.

Here, materials of the first hydrophilic sublayer and the second hydrophilic sublayer are not limited. For example, the material of the first hydrophilic sublayer may include fluorocarbon compounds, and the material of the second hydrophilic sublayer may include fluorocarbon compounds. By changing a thickness of the compounds on a nanoscale, different hydrophilic and hydrophobic effects may be achieved.

In one or more embodiments, referring to that shown in FIGS. 2 and 6, the phase shifter further includes the first hydrophobic part 11. The first hydrophobic part 11 is arranged on a side of the substrate, on which the hydrophobic conductive part is located, and is located in the areas between the first wire 1 and the second wires 2 as shown in FIG. 2. An orthographic projection of the first hydrophobic part on the substrate is located within the orthographic projection of the hydrophobic conductive part on the substrate. In this way, a first hydrophobic part is arranged directly below the hydrophobic conductive part, which is more conducive to pushing the water droplets directly below the hydrophobic conductive part to the hydrophilic part on both sides.

In an embodiment, in order to ensure a hydrophobic effect of the first hydrophobic part, the contact angle of the first hydrophobic part is C, $170° \leq C \leq 180°$. The contact angle of the first hydrophobic part may be 170°, 175° or 180°, etc. A material of the first hydrophobic part is not limited here. For example, the material of the first hydrophobic part may include fluorocarbon compound.

Further in an embodiment, in order to further improve the hydrophobic effect of the first hydrophobic part, referring to that shown in FIG. 6, the first hydrophobic part 11 includes a plurality of hydrophobic units 110 arranged in an array.

Here, a shape and a number of the hydrophobic unit are not limited. For example, the shape of the hydrophobic unit may include a cylinder, a cube, a circular platform, or a stair platform, and so on. In order to reduce manufacturing difficulty, cylindrical hydrophobic units may be used.

Another structure of the hydrophilic part is provided below.

With reference to that shown on FIG. 11 and FIG. 12, the hydrophilic part 4 is cross arranged with the first wire 1 and insulated from the first wire 1. At least one end of the hydrophilic part 4 is overlapped with the second wire 2 at one side of the first wire 1, and is insulated from the second wire 2.

The hydrophilic part may include a hydrophilic simple-supported beam structure as shown in FIGS. 11 and 12, that is, both ends of the hydrophilic part 4 are respectively overlapped with the second wires 2 on both sides of the first wire 1, and are insulated from the second wires 2. Alternatively, the hydrophilic part may include a hydrophilic cantilever beam, one end of the hydrophilic cantilever beam is overlapped with the second wire on one side of the first wire and insulated from the second wire, while the other end of the hydrophilic cantilever beam is suspended. It should be noted that the hydrophilic part only plays a hydrophilic role and does not need to be energized.

A material of the above hydrophilic part may include silicon nitride or silicon dioxide, to ensure the hydrophilicity.

In some embodiments, with reference to that shown in FIGS. 11 and 12, both ends of the hydrophilic part 4 are respectively overlapped with the second wires 2 located on both sides of the first wire 1, and are insulated from the second wires 2. One end of the hydrophobic conductive part 3 is overlapped with the second wire 2 at one side of the first wire 1, and is insulated from the second wire 2, while the other end of the hydrophobic conductive part 3 is suspended. At this time, the hydrophilic part is a hydrophilic simple-supported beam structure, and the hydrophobic conductive part is a hydrophobic cantilever beam structure.

Further in an embodiment, a height of the hydrophilic part is lower than the height of the hydrophobic conductive part by 0.1-10 microns, wherein the height of the hydrophilic part is a distance between the hydrophilic part and the first wire, and the height of the hydrophobic conductive part is the distance between the hydrophobic conductive part and the first wire when the hydrophobic conductive part is not powered on.

Specific values of the height of the hydrophilic part and the height of the hydrophobic conductive part are not limited here. For example, the height of the hydrophilic part may be 0.1-50 microns, and the height of the hydrophobic conductive part may be 0.1-50 microns.

If the height of the hydrophilic part is higher than the height of the hydrophobic conductive part, adhesion will occur when a surface energy of the hydrophobic structure is higher and a surface energy of the hydrophilic structure is lower. If the height of the hydrophilic part is too much lower than that of the hydrophobic conductive part, there is no enough protection effect. If the height of the hydrophilic part is too less low than that of the hydrophobic conductive part, there is a risk of adhesion occurrence. The height of the hydrophilic part shall be lower than that of the hydrophobic conductive part by 0.1-10 microns, which may achieve the protection effect.

Further optional, in order to protect the hydrophobic conductive part to the greatest extent and avoid the adhesion problem due to the influence of water droplets on the hydrophobic conductive part, referring to that shown in FIG. 11 and FIG. 12, the orthographic projection of the hydrophilic part 4 on the substrate are respectively located on both sides of the orthographic projection of the hydrophobic conductive part 3 on the substrate. At this time, areas on both sides of the hydrophobic conductive part (i.e., the upper side and the lower sides along the second direction, i.e., the OB direction, as shown in FIG. 11) are provided with the hydrophilic part 4.

In an embodiment, in order to further improve the hydrophobic effect, referring to that shown in FIG. 12, the phase shifter further includes the second hydrophobic parts 12, the second hydrophobic parts 12 are arranged on one side of the substrate, on which the hydrophobic conductive part is located, and are located in the areas between the first wire 1 and the second wires 2.

A material of the second hydrophobic part is not limited herein. For example, the material of the second hydrophobic part may include fluorine-containing materials such as fluorocarbon compounds and so on, for example, perfluorooctanoic acid, which may be specifically prepared by means of liquid deposition (such as liquid phase self-assembly), electrodeposition or solid phase deposition (such as chemical vapor deposition) and so on. A contact angle of the hydrophobic part may be greater than 90°, such as 95°, 100°, 130°, 150° or 170°, and so on.

The above second hydrophobic parts may cover the areas between the first wire and the second wires, or, the second hydrophobic parts are set in a part of the areas between the first wire and the second wires, which is not limited here.

A structure of the above second hydrophobic part is not limited. For example, the second hydrophobic part may include a layer of hydrophobic layer, or the second hydrophobic part may include a plurality of hydrophobic units arranged in an array, the second hydrophobic part may further include other structures, which will not be listed here.

In one or more embodiments, in order to simplify the fabrication difficulty, referring to that shown in FIG. 2, the hydrophobic conductive part includes a conductive layer 31 and a hydrophobic layer 32 covering an exposed part of the conductive layer.

The hydrophobic conductive part has hydrophobicity and conductivity, and a material of the conductive layer may include metal materials such as copper, aluminum or gold and so on, which may be specifically prepared by means of magnetron sputtering, thermal evaporation or electroplating and so on. The material of the hydrophobic layer may include fluorine-containing materials such as fluorocarbon compounds and so on, for example, perfluorooctanoic acid, which may be specifically prepared by means of liquid deposition (such as liquid phase self-assembly), electrodeposition or solid phase deposition (such as chemical vapor deposition) and so on. A contact angle of the hydrophobic layer may be greater than 90°, such as 95°, 100°, 130°, 150° or 170°, and so on.

An embodiment of the application further provides a method for preparing the above phase shifter, including the following steps S01-S04.

S01. Providing a substrate, wherein a material of the substrate may include silicon nitride, silicon oxide, silicon or a semiconductor material, such as gallium nitride and so on, which may be specifically prepared by means of magnetron sputtering, or chemical vapor deposition and so on.

S02. Forming a first wire and second wires on a side of the substrate, wherein the second wires are arranged on two opposite sides of the first wire, and the first wire and the second wires are arranged in parallel and insulated from each other.

For example, the first wire and the second wires may be formed by means of magnetron sputtering, thermal evaporation or electroplating and so on.

S03. Forming a hydrophobic conductive part, wherein the hydrophobic conductive part is arranged crosswise with the first wire and is insulated from the first wire, and at least one end of the hydrophobic conductive part is overlapped with the second wire at one side of the first wire, and is insulated from the second wire.

The means of forming the hydrophobic conductive part is related to the structure of the hydrophobic conductive part. For example, if the hydrophobic conductive part includes a conductive layer and a hydrophobic layer covering an exposed part of the conductive layer, the conductive layer may be formed first by means of magnetron sputtering, thermal evaporation, or electroplating and so on, and then the hydrophobic layer may be formed by means of liquid deposition (such as liquid phase self-assembly), electrodeposition, or solid phase deposition (such as chemical vapor deposition) and so on.

S04. Forming a hydrophilic part, wherein a minimum distance between an orthographic projection of the hydrophilic part on the substrate and an orthographic projection of the part of the hydrophobic conductive part that does not overlap with the second wires, on the substrate, in a first direction, is less than or equal to a preset value, and the first direction is parallel to an extending direction of the first wire.

It should be noted that an execution sequence of step S03 and step S04 is not limited herein, and the execution sequence needs to be determined by combining the structures of hydrophobic conductive part and hydrophilic part.

By executing the phase shifter formed in step S01-S04, if water droplets are generated in the area where the hydrophobic conductive part is located, due to the hydrophobic conductive part and the hydrophilic part, the water droplets will be directed to the area where the hydrophilic part is located, thereby reducing the adhesion caused by the water droplets, thereby improving the performance of the phase shifter and improving the reliability of working in a humid environment. The preparation method is simple and easy to realize.

Taking the phase shifter structure shown in FIG. 1 as an example, a specific preparation method is provided below. The method includes the following steps S10-S18.

S10. Depositing a silicon nitride layer on a silicon dioxide substrate by plasma enhanced chemical vapor deposition (PECVD).

S11. Sputtering metal copper by magnetron, and patterning a signal line (i.e., the first wire) and a ground wire (i.e., the second wire).

S12. Respectively depositing silicon nitride insulating layers on the signal line and the ground wire, to form a first insulating part and a second insulating part, wherein the first insulating part is arranged at a side of the first wire away from the silicon dioxide substrate, and the second insulating part is arranged at a side of the second wire away from the silicon dioxide substrate.

S13. Forming a sacrificial layer.

S14. Depositing a copper simple-supported beam, to form a conductive layer of a hydrophobic conductive part.

S15. Depositing silicon dioxide hydrophilic units, to form a hydrophilic part.

S16. Using photoresist to protect the silicon dioxide hydrophilic units, and releasing the sacrificial layer.

S17. Depositing fluorocarbon polymer by low pressure chemical vapor deposition (LPVCD), to perform a hydrophobic process on whole structure, so as to form the hydrophobic conductive part.

S18. Peeling the photoresist, to form the phase shifter as shown in FIG. 1.

The terminologies “one embodiment”, “an embodiment” or “one or more embodiments” used herein means that the specific features, structures or characteristics described in combination with the embodiment are included in at least one embodiment of the application. In addition, please note that the terminologies “in one embodiment” herein do not necessarily refer to the same embodiment.

In the specification provided herein, numerous specific details are explained. However, it may be understood that the embodiments of the present application may be practiced without these specific details. In some examples, well-known methods, structures and techniques are not shown in detail, so as not to obscure the understanding of this specification.

Finally, it should be noted that the above embodiments are only used to illustrate the technical solution of the application, and not limited to the application. Although the application has been described in detail with reference to the above embodiments, those ordinary skilled in the art should understand that they may still modify the technical solutions recorded in the above embodiments, or equivalent replace some of the technical features therein. However, these modifications or substitutions do not make the essence of the corresponding technical solutions separate from the spirit and scope of the technical solutions of the embodiments of the application.

The invention claimed is:

1. A phase shifter, comprising:

a substrate;

a first wire and second wires arranged on a side of the substrate, wherein the second wires are arranged on two opposite sides of the first wire, and the first wire and the second wires are arranged in parallel and insulated from each other;

a hydrophobic conductive part, wherein the hydrophobic conductive part is arranged crosswise with respect to the first wire and is insulated from the first wire, and at least one end of the hydrophobic conductive part is overlapped with the second wire at one side of the first wire, and is insulated from the second wire; and a hydrophilic part, wherein a minimum distance between an orthographic projection of the hydrophilic part on the substrate and an orthographic projection of the hydrophobic conductive part that does not overlap with the second wires, on the substrate, in a first direction, is less than or equal to a preset value, and the first direction is parallel to an extending direction of the first wire.

2. The phase shifter according to claim 1, wherein the orthographic projection of the hydrophilic part on the substrate is located on at least one side of the orthographic projection of the hydrophobic conductive part on the substrate.

3. The phase shifter according to claim 1, wherein the hydrophilic part is arranged on the side of the substrate, and is located in areas between the first wire and the second wires.

4. The phase shifter according to claim 3, wherein the first wire comprises a first side and a second side opposite to each other, an area between the first side of the first wire and the second wire set on the first side of the first wire is a first area, an area between the second side of the first wire and the second wire set on the second side of the first wire is a second area; and the hydrophilic part comprises a plurality of hydrophilic units, the plurality of hydrophilic units are divided into two groups, a first group of the plurality of hydrophilic units are located in the first area, and a second group of the plurality of hydrophilic units are located in the second area.

5. The phase shifter according to claim 4, wherein each group of the hydrophilic units is divided into a first part and a second part, orthographic projections of the hydrophilic units of the first part on the substrate are located on a first side of the orthographic projection of the hydrophobic conductive part on the substrate, and orthographic projections of the hydrophilic units of the second part on the substrate are located on a second side of the orthographic projection of the hydrophobic conductive part on the substrate, opposite to the first side of the orthographic projection of the hydrophobic conductive part on the substrate.

6. The phase shifter according to claim 5, wherein in the respective parts of the respective groups of the hydrophilic units, the hydrophilic units have a same hydrophilicity.

7. The phase shifter according to claim 6, wherein in the respective parts of the respective groups of the hydrophilic units, the plurality of the hydrophilic units arranged along a second direction do not contact each other, and the second direction intersects the first direction.

8. The phase shifter according to claim 7, wherein the respective parts of the respective groups of the hydrophilic units comprise two hydrophilic units arranged along the second direction, and separated by a first distance, the first distance is less than or equal to a height of the hydrophobic conductive part, and the height of the hydrophobic conductive part is a distance between the hydrophobic conductive part and the first wire when the hydrophobic conductive part is not powered on.

9. The phase shifter according to claim 5, wherein, in the respective parts of the respective groups of hydrophilic units, the hydrophilic unit comprises a hydrophilic layer with hydrophilicity decreasing in a direction from an area far from the hydrophobic conductive part to an area close to the hydrophobic conductive part.

10. The phase shifter according to claim 9, wherein the hydrophilic layer comprises a first hydrophilic sublayer and a second hydrophilic sublayer, compared with the second hydrophilic sublayer, the first hydrophilic sublayer is further away from the hydrophobic conductive part, and a contact angle of the first hydrophilic sublayer is smaller than a contact angle of the second hydrophilic sublayer.

11. The phase shifter according to claim 10, wherein the contact angle of the first hydrophilic sublayer is X, $X \leq 10°$, and the contact angle of the second hydrophilic sublayer is Y, $20° \leq Y \leq 65°$.

12. The phase shifter according to claim 3, wherein the phase shifter further comprises a first hydrophobic part, and the first hydrophobic part is arranged on the side of the substrate, and is located in the areas between the first wire and the second wires; and an orthographic projection of the first hydrophobic part on the substrate is located on an area within the orthographic projection of the hydrophobic conductive part on the substrate.

13. The phase shifter according to claim 12, wherein the first hydrophobic part comprises a plurality of hydrophobic units arranged in an array.

14. The phase shifter according to claim 1, wherein the hydrophobic conductive part comprises a conductive layer and a hydrophobic layer covering an exposed part of the conductive layer.

15. The phase shifter according to claim 1, wherein the hydrophilic part is cross arranged with the first wire and insulated from the first wire, and at least one end of the hydrophilic part is overlapped with the second wire at one side of the first wire, and is insulated from the second wire.

16. The phase shifter according to claim 15, wherein both ends of the hydrophilic part are respectively overlapped with the second wires on both sides of the first wire, and are insulated from the second wires; and one end of the hydrophobic conductive part is overlapped with the second wire on one side of the first wire, and is insulated from the second wire, and another end of the hydrophobic conductive part is suspended.

17. The phase shifter according to claim 15, wherein a height of the hydrophilic part is lower than that of the hydrophobic conductive part by 0.1-10 microns, the height of the hydrophilic part is a distance between the hydrophilic part and the first wire, and the height of the hydrophobic conductive part is a distance between the hydrophobic conductive part and the first wire when the hydrophobic conductive part is not powered on.

18. The phase shifter according to claim 15, wherein the orthographic projection of the hydrophilic part on the substrate are respectively located on both sides of the orthographic projection of the hydrophobic conductive part on the substrate.

19. The phase shifter according to claim 15, wherein the phase shifter further comprises second hydrophobic parts, and the second hydrophobic parts are arranged on the side of the substrate, and are located in the areas between the first wire and the second wires.

20. A method for preparing a phase shifter, wherein the phase shifter includes: a substrate; a first wire and second wires arranged on a side of the substrate, wherein the second wires are arranged on two opposite sides of the first wire, and the first wire and the second wires are arranged in parallel and insulated from each other; a hydrophobic conductive part, wherein the hydrophobic conductive part is arranged crosswise with respect to the first wire and is insulated from the first wire, and at least one end of the hydrophobic conductive part is overlapped with the second wire at one side of the first wire, and is insulated from the second wire; and a hydrophilic part, wherein a minimum distance between an orthographic projection of the hydrophilic part on the substrate and an orthographic projection of the hydrophobic conductive part that does not overlap with the second wires, on the substrate, in a first direction, is less than or equal to a preset value, and the first direction is parallel to an extending direction of the first wire, and the method comprises:

providing the substrate;

forming the first wire and the second wires on the side of the substrate, wherein the second wires are arranged on two opposite sides of the first wire, and the first wire and the second wires are arranged in parallel and insulated from each other;

forming the hydrophobic conductive part, wherein the hydrophobic conductive part is arranged crosswise with the first wire and is insulated from the first wire, and at least one end of the hydrophobic conductive part is overlapped with the second wire at one side of the first wire, and is insulated from the second wire; and forming the hydrophilic part, wherein the minimum distance between the orthographic projection of the hydrophilic part on the substrate and the orthographic projection of the hydrophobic conductive part that does not overlap with the second wires, on the substrate, in the first direction, is less than or equal to the preset value, and the first direction is parallel to the extending direction of the first wire.

* * * * *